(12) United States Patent
Boeschen et al.

(10) Patent No.: US 9,162,423 B2
(45) Date of Patent: Oct. 20, 2015

(54) MULTILAYERED BEARING SHELL

(75) Inventors: Reiner Boeschen, Bermatingen (DE); Robert Mergen, Altmuenster (AT); Falko Langbein, Gmunden (AT); Ulrich Schmid, Meckenbeuren (DE)

(73) Assignees: Miba Gleitlager GmbH, Laakirchen (AT); MTU Friedrichshafen GmbH, Friedrichshafen (DE)

( * ) Notice: Subject to any disclaimer, the term of this patent is extended or adjusted under 35 U.S.C. 154(b) by 431 days.

(21) Appl. No.: 13/495,066

(22) Filed: Jun. 13, 2012

(65) Prior Publication Data

US 2012/0321909 A1    Dec. 20, 2012

(30) Foreign Application Priority Data

Jun. 14, 2011 (AT) .................................. A 864/2011

(51) Int. Cl.
| | | |
|---|---|---|
| *B32B 15/20* | (2006.01) | |
| *B32B 15/01* | (2006.01) | |
| *C22C 9/02* | (2006.01) | |
| *F16C 33/14* | (2006.01) | |
| *F16C 33/12* | (2006.01) | |
| *C22C 21/00* | (2006.01) | |
| *F16C 17/02* | (2006.01) | |

(52) U.S. Cl.
CPC ............... *B32B 15/017* (2013.01); *C22C 9/02* (2013.01); *C22C 21/003* (2013.01); *F16C 33/121* (2013.01); *F16C 33/14* (2013.01); *F16C 17/022* (2013.01); *F16C 2204/12* (2013.01); *Y10T 428/12708* (2015.01)

(58) Field of Classification Search
None
See application file for complete search history.

(56) References Cited

U.S. PATENT DOCUMENTS

| | | | |
|---|---|---|---|
| 5,525,203 A | 6/1996 | Rumpf et al. | |
| 6,099,663 A * | 8/2000 | Bhargava | 148/434 |
| 6,254,701 B1 * | 7/2001 | Oshiro et al. | 148/432 |
| 7,618,190 B2 | 11/2009 | Schrüfer | |
| 8,033,733 B2 | 10/2011 | Lang | |
| 2002/0110478 A1 * | 8/2002 | Lawrence | 420/476 |
| 2004/0048094 A1 | 3/2004 | Rubel et al. | |
| 2006/0245675 A1 * | 11/2006 | Lang | 384/95 |
| 2007/0065067 A1 | 3/2007 | Gartner et al. | |
| 2008/0102307 A1 | 5/2008 | Zidar | |
| 2011/0027612 A1 | 2/2011 | Funaki et al. | |
| 2011/0034354 A1 | 2/2011 | Zidar | |

FOREIGN PATENT DOCUMENTS

| | | |
|---|---|---|
| AT | 399 544 | 5/1995 |
| AT | 412 812 | 7/2005 |
| AT | 502 546 | 4/2007 |
| AT | 506 641 | 10/2009 |

(Continued)

*Primary Examiner* — Mark Ruthkosky
*Assistant Examiner* — Daniel J Schleis
(74) *Attorney, Agent, or Firm* — Collard & Roe, P.C.

(57) ABSTRACT

The invention relates to a multilayered bearing shell (2) comprising a back metal layer (3) as a carrier element for the layer structure and at least one further bearing layer joined to the back metal layer (3), wherein the back metal layer (3) is made from a bronze. The back metal layer (3) contains in addition to copper, which forms the matrix of the bronze, tin in a proportion selected from a range with a lower limit of 1.25 wt. % and an upper limit of 12 wt. %, zinc in a proportion selected from a range with a lower limit of 0.25 wt. % and an upper limit of 6 wt. % and phosphorus in a proportion selected from a range with a lower limit of 0.01 wt. % and an upper limit of 0.5 wt. %.

9 Claims, 2 Drawing Sheets

(56) References Cited

FOREIGN PATENT DOCUMENTS

| | | |
|---|---|---|
| DE | 29 02 682 | 8/1980 |
| EP | 1 717 469 | 11/2006 |
| GB | 554355 | 6/1943 |
| GB | 556248 | 9/1943 |
| GB | 2 046 850 | 11/1980 |
| GB | 2 315 301 | 1/1998 |
| GB | 2 438 977 | 12/2007 |
| WO | WO 02/48563 | 6/2002 |

* cited by examiner

MULTILAYERED BEARING SHELL

CROSS REFERENCE TO RELATED APPLICATIONS

Applicants claim priority under 35 U.S.C. §119 of Austrian Application No. A 864/2011 filed on Jun. 14, 2011, the disclosure of which is incorporated by reference.

The invention relates to a multilayered bearing shell comprising a back metal layer as a carrier element for the layer structure and at least one further bearing layer joined to the back metal layer, wherein the back metal layer is made from bronze, as well as a method for producing a multilayered bearing element comprising a back metal layer made of bronze, which is produced by means of a continuous casting process.

Anti-friction bearings, which are used in all kinds of engines, nowadays usually have at least a two-layered structure, whereby particularly for more highly loaded engines bearing shells are also used with three and more layers, so that the latter can meet the specific requirements made of them. Normally said anti-friction bearings have a back metal layer made of steel, which forms the carrier layer for the whole structure. Occasionally possible alternative materials have been specified for the back metal layer, for example copper alloys, such as brass or bronze, in AT 502 546 A1.

The back metal layer is in direct contact with the bearing mount after the installation of the anti-friction bearing half shell. Cyclical, undesirable relative movements of components relative to one another with very small vibrational amplitude on the contact surfaces between the bearing and bearing mount, particularly with highly-loaded connecting rod bearings, may lead to frictional welding or frictional corrosion, i.e. localised damage and thereby to the "seizure" of the anti-friction bearing in the bearing housing. This damage mechanism is generally referred to as fretting. This type of damage is particularly noticeable in the case of steel body contacts under load, e.g. contacts of a steel anti-friction bearing back with a steel or cast iron bearing housing. Frictional corrosion is thus determined essentially by the pairing of materials. Hard materials or components with hard surface layers are more inclined to wear away by frictional corrosion than soft materials which tend to seize up. In the latter case relative movement is then prevented but damage is also caused. As a result of frictional corrosion, in cases with particularly high levels of surface damage, frictional fatigue fractures, i.e. shell breakage, often occur.

In order to address this problem a variety of different materials have been proposed in the prior art for producing back coatings for anti-friction bearings to form a so-called antifretting layer. Thus e.g. AT 506 641 A1 describes a silver alloy for this purpose. From AT 399 544 B a corrosion protective layer made from an Sn-alloy is known. Ni, Cr or Co alloys for antifretting layers are known from GB 2315301 A1. According to WO 02/48563 A1 a tin bronze is used as an antifretting layer. A Cu—Sn-alloy deposited galvanically as an antifretting layer on steel with a proportion of tin of between 10% and 15% is known from GB 556,248 A and/or GB 554,355 A. The provision of an antifretting layer on the rear side of the back metal layer is associated with higher production costs. Bonding layers may need to be applied in order to ensure a sufficient bonding strength between the back metal layer and the antifretting layer.

The objective of the present invention is to create a multilayered bearing shell which has improved antifretting properties.

The objective of the invention is achieved by means of the aforementioned multilayered bearing shell, in which the back metal layer contains in addition to copper, which forms the matrix of the bronze, tin in a proportion selected from a range with a lower limit of 1.25 wt. % and an upper limit of 12 wt. %, zinc in a proportion selected from a range with a lower limit of 0.25 wt. % and an upper limit of 6 wt. % and phosphorus in a proportion selected from a range with a lower limit of 0.01 wt. % and an upper limit of 0.5 wt. %. Furthermore, the objective is achieved by the aforementioned method, in which the multilayered bearing element is formed according to the invention and in which after the continuous casting process hardening is performed by rolling, whereby the rolling is performed in several stages and intermediate annealing can be performed optionally between at least two stages, so that the back metal layer has a grain size of the alloy that corresponds to the respective requirements, e.g. of a maximum of 30 μm.

Surprisingly, it has been established that by means of tin bronzes with these compositions not only can fretting problems be overcome so that no separate antifretting layer needs to be deposited on the back metal layer, the rear side in contact with the material of the bearing mount is thus coating free, but also said tin bronzes have sufficient mechanical properties, such as for example alternate bending strength, in order to be used as a carrier material for the layer structure of the multilayered bearing shell. This is surprising because such tin bronzes are already used in the field of anti-friction bearings, in application as a bearing alloy on a steel back. In particular it was found that both the static and the dynamic fatigue strength at least almost reach the level of steel, compared with a steel that is commonly used in the field of anti-friction bearings as a back metal, and that the antifretting properties are better than antifretting coatings based on nickel bronzes, aluminium bronzes or iron-containing bronzes. Furthermore, with respect to spreading and projection loss said tin bronzes have good properties so that the spreading and projection loss can be maintained over a longer period. Furthermore, by avoiding the antifretting layer also the frequently used cyanide process for depositing said layer can be avoided, whereby advantages can be achieved both with regard to workplace safety and the environment, and significantly savings can also be made.

The term "spreading" is used to mean that in order to achieve a stable position, to avoid fretting and obtain the required contour for the bearing, the circumferential length of the bearing is defined relative to the bearing mount so that sufficiently high tension is created by means of the pressing in process. This is achieved geometrically by spreading over the bearing mount and mainly by means of bearing projection. This tension increases because of the increasing loads of the anti-friction bearing, overlayered by thermal expansions and dynamic wave loading in modern engines. Thus with commonly used steel shell materials, but also with bearing metals or alloys for the anti-friction layers, plastic and pseudo-elastic effects occur, which finally result in a geometric change in the bearing shell itself. This change in geometry ultimately results in a loss of the spreading on the one hand and a reduction in the bearing projection on the other hand. As a result the bearing is no longer stable and micromovements are made possible which lead to fretting or even cause the co-rotation of the anti-friction bearing half shells or the bearing.

Tin is used as the main alloy element and by means of mixed crystal hardening produces a basic hardness of the copper matrix. At more than 12 wt. % tin however the risk of forming brittle intermetallic phases and the tendency to segregate increases significantly, whereby the quality of the structure and therefore the properties of the back metal layer are influenced negatively. At less than 1.25 wt. % the desired properties of the tin bronze are not achieved or not in the desired amount.

It should be noted in general at this point that the latter explanations relating to the lower range limit also apply to all of the lower range limits of the individual elements mentioned in this description.

Zinc can be seen as a substitute for tin. In particular with contents of up to 2 wt. % zinc, tin can be substituted by zinc in a ratio of 1:2. Zinc increases the strength while retaining the toughness of the tin bronze, whereby the alloy can be hot and cold formed easily. Furthermore, zinc results in a better deoxidization of the melt which in turn has a positive influence on the melt quality and then the quality of the cast material. The zinc content is restricted to a maximum of 6 wt. %, as with greater proportions of zinc the risk of forming intermetallic phases with copper increases.

Phosphorus is mainly used as a deoxidizing agent for the melt. Furthermore, with the addition of phosphorus also a slight increase in the tensile strength and the hardness of the tin bronze could be observed, with the expansion remaining virtually unaffected. With a phosphorus content of more than 0.5 wt. % however, the castability of the tin bronze is made worse.

To improve these effects further preferably the proportion of tin is selected from a range with a lower limit of 3 wt. % and an upper limit of 8 wt. % and/or the proportion of zinc is selected from a range with a lower limit of 1 wt. % and an upper limit of 4 wt. % and/or the proportion of phosphorus is selected from a range with a lower limit of 0.25 wt. % and an upper limit of 0.4 wt. %.

According to one embodiment variant of the multilayered bearing shell the total proportion of tin and zinc is a maximum of 15 wt. %. By restricting the total proportion of tin and zinc to this amount the risk of forming intermetallic phases and the risk of segregation is reduced further. In addition the castability of the melt is improved, as melts with a total proportion of tin and zinc of more than 15 wt. % have a very broad solidification interval. In addition, the formability of the casting material is also improved, which is a particular advantage with regard to the forming of the plane, strip-like semi-finished product into the shell shape.

To achieve a further improvement of these effects preferably the total proportion of tin and zinc is limited to a maximum of 13 wt. % or the total proportion of tin and zinc is selected from a range with a lower limit of 6 wt. % and an upper limit of 12 wt. %.

A portion of the copper in an amount to a maximum of 7 wt. %, in particular a maximum of 6 wt. %, can be replaced by at least one element from a group comprising cobalt, zirconium, manganese, titanium, magnesium, boron, niobium, vanadium, iron, chromium, scandium and carbon.

A finer grain structure of the cast alloy can be achieved by means of cobalt or boron. This property can be increased beyond all expectation by adding both cobalt and boron, and it is presumed that an interaction takes place between cobalt and boron in the melt of the tin bronze.

By means of manganese the cold strength and warm strength of the tin bronze can be improved by mixed crystal hardening. In addition the recrystallization temperature can be raised.

The hardening of the tin bronze can be achieved by adding titanium to the tin bronze, by means of precipitation hardening. In particular, in association with carbon also a grain-refining effect can be achieved, as the carbides function as crystallization nuclei.

By adding magnesium also precipitation hardening can be achieved by $Cu_2Mg$ and thereby an increase in the strength of the tin bronze.

Owing to the precipitation phase $Cu_3Zr$ this also applies to the addition of zirconium, whereby zirconium can also be added to increase the recrystallization threshold of previously cold-hardened tin bronzes. By the formation of carbide zirconium can also have a grain-refining effect owing to the formation of crystallization nuclei.

Niobium or vanadium can be added to refine the grain size of the cast structure, whereby here too also an increase in the effect can be achieved with the simultaneous addition of boron.

Iron is also used to refine the grain size of the cast structure, whereby an increase in the effect was observed with phosphorus or the simultaneous addition of nickel.

By adding chromium to the tin bronze the latter can be hardened by means of thermosetting, whereby after setting elemental chromium is precipitated. No intermetallic bonds are formed between Cu and Cr, so that by adding chromium to the tin bronze no appreciable losses in expansion could be established, despite the increasing strengths during the annealing.

Scandium is used to increase the recrystallization threshold, after previous cold forming.

Nickel can be added in connection with phosphorus to increase the strength and can be added in small amounts in connection with phosphorus to refine the grain size.

Cobalt can be included in a proportion, which is selected from a range with a lower limit of 0.01 wt. % and an upper limit of 2.0 wt. % and/or manganese in a proportion, which is selected from a range with a lower limit of 0.01 wt. % and an upper limit of 0.5 wt. %, wherein the total proportion of the elements cobalt, zirconium and manganese can be selected from a range with a lower limit of 0.02 wt. % and an upper limit of 2.1 wt. %.

The proportion of cobalt is limited to a maximum of 2.0 wt. %, in order to avoid separation during the cooling of the melt, whereby the properties of the back metal layer would be made worse by the thereby deposited phases.

By means of the selected range for the proportion of manganese, manganese can be used on the one hand solely for deoxidization (in a proportion of between 0.01 wt. % to 0.02 wt. %) or from a proportion of 0.02 wt. % can also contribute to an increase in the strength of the tin bronze. In proportions of over 0.5 wt. % the strength of the tin bronze is too great.

The proportion of zirconium can be between 0.01 wt. % and 0.3 wt. %, whereby even small amounts (up to about 0.1 wt. %) facilitate the formation of a heterogenic structure and thereby contribute to the hardening. In a range of between 0.2 wt. % to 0.3 wt. % a maximum increase of the recrystallization threshold from previously cold-hardened samples was observed. However, even small amounts of zirconium in a range of 0.02 wt. %-0.03 wt. % can have a grain refining effect in connection with carbon, as the carbides formed with carbon act as crystallization nuclei.

The total amount of cobalt, zirconium and manganese was limited to 2.1 wt. %, as higher proportions of these elements do not yield additional positive properties, but rather make the working of the melt more difficult, for example because of the aforementioned segregation.

Preferably, the proportion of cobalt is selected from a range with a lower limit of 0.05 wt. % and an upper limit of 1.5 wt. % and/or the proportion of manganese is selected from a range with a lower limit of 0.1 wt. % and an upper limit of 0.4 wt. % and/or the total proportion of the elements cobalt, zirconium and manganese is selected from a range with a lower limit of 0.02 wt. % and an upper limit of 1.8 wt. %.

Titanium can be included in a proportion, which is selected from a range with a lower limit of 0.05 wt. % and an upper limit of 0.5 wt. % and/or magnesium in a proportion selected from a range with a lower limit of 0.01 wt. % and an upper limit of 0.2 wt. %, wherein the total proportion of the elements titanium and magnesium can be selected from a range with a lower limit of 0.05 wt. % and an upper limit of 0.5 wt. %.

These elements are only alloyed in small amounts in order to simplify the melt-metallurgical processing, in particular with regard to the impurity of the melt with the oxides of these metals and the melting loss of the melt.

By way of the titanium content different evacuation processes can be carried out. With a low content there is continual precipitation, with a higher content there are discontinuous precipitations. The proportion of titanium is limited to a maximum of 0.5 wt. %, in order to avoid reversed block segregations (formation of Ti-concentration gradients) and thereby uneven properties in the cast piece.

The proportion of magnesium is limited to a maximum of 0.2 wt. %, so as not to worsen the shapability of the tin bronze.

The total proportion of titanium and magnesium is limited to a maximum of 0.5 wt. %, so that the tin bronze is not too hard and formability does not suffer.

Preferably, the proportion of titanium is selected from a range with a lower limit of 0.1 wt. % and an upper limit of 0.2 wt. % and/or the proportion of magnesium is selected from a range with a lower limit of 0.05 wt. % and an upper limit of 0.14 wt. % and/or the total proportion of the elements titanium and magnesium is selected from a range with a lower limit of 0.1 wt. % and an upper limit of 0.4 wt. %.

Niobium can be included in a proportion which is selected from a range with a lower limit of 0.01 wt. % and an upper limit of 0.5 wt. % and/or vanadium in a proportion, which is selected from a range with a lower limit of 0.01 wt. % and an upper limit of 0.25 wt. % and/or iron in a proportion, which is selected from a range with a lower limit of 0.1 wt. % and an upper limit of 2.0 wt. %, wherein the total proportion of the elements niobium, vanadium, iron can be selected from a range with a lower limit of 0.01 wt. % and an upper limit of 2.0 wt. %.

For niobium and vanadium, which both have a grain-refining effect, the upper limits were selected with respect to the fact that higher proportions did not have any additional effect or the additional effect is not achieved to the same extent as the addition in a proportion from the claimed ranges.

The proportion of iron is limited to a maximum of 2 wt. %, as with higher proportions of zinc the formability of the tin bronze can form negatively influencing iron-zinc-phases, whereby the tin bronze becomes brittle.

For this reason the total proportion of these elements is also limited to a maximum of 2 wt. %, as the negative influence of higher proportions of iron can increase by means of the simultaneous presence of niobium and/or vanadium.

However, it was observed that by means of the inclusion of phosphorus in the tin bronze iron can also have grain-refining effect through the formation of phosphides, which in turn form crystallization nuclei.

Preferably, the proportion of niobium is selected from a range with a lower limit of 0.1 wt. % and an upper limit of 0.30 wt. % and/or the proportion of vanadium is selected from a range with a lower limit of 0.05 wt. % and an upper limit of 0.16 wt. % and/or the proportion of iron is selected from a range with a lower limit of 0.5 wt. % and an upper limit of 1.3 wt. % and/or the total proportion of the elements titanium and magnesium is selected from a range with a lower limit of 0.1 wt. % and an upper limit of 1.5 wt. %.

Chromium can be included in a proportion, which is selected from a range with a lower limit of 0.01 wt. %, in particular 0.1 wt. %, and an upper limit of 1.6 wt. %, in particular 1.2 wt. %.

The upper limit of a maximum of 1.6 wt. % was selected in view of the possible formation of chromium oxides in the melt, which like titanium or magnesium negatively influence the melt-metallurgical production by contaminating the melt and melt loss.

The proportion of scandium can be a maximum of 0.3 wt. %, as scandium also has a grain-refining effect and a greater proportion has no additional effect.

The proportion of boron can be selected from a range with a lower limit of 0.08 wt. % and an upper limit of 0.15 wt. %, that of carbon from a range with a lower limit of 0.05 wt. % and an upper limit of 0.15 wt. %. As these elements, as already explained above, are added to increase the grain-refining effect of the said elements, higher proportions of these elements do not have an additional effect taking into account the proportions of the elements whose grain-refining effect is increased.

Preferably, the proportion of boron is selected from a range with a lower limit of 0.1 wt. % and an upper limit of 0.12 wt. % and/or the proportion of carbon is selected from a range with a lower limit of 0.07 wt. % and an upper limit of 0.12 wt. %.

A portion of the copper can be replaced by nickel in a proportion of a maximum of 2 wt. %, in particular a maximum of 1.5 wt. %, since as with iron phosphides can be formed which act as crystallization nuclei and therefore are grain-refining. In particular, this applies when the proportion of the phosphorus is a maximum of 0.25 wt. %.

In the preferred embodiment variant of the multilayered bearing shell the bronze is nickel-free and/or aluminium-free. Interestingly, fretting tests have shown that in particular higher amounts of nickel (which would be necessary for a significant increase in strength, e.g. above 2 wt. %, as is the case in spinodal hardening copper-nickel-tin alloys known from the prior art) have a very negative effect on the fretting properties. With regard to aluminium tests have shown that even low proportions in the tin bronze result in increased melt loss during the melt-metallurgical production of the bronze.

As mentioned above the bronze can preferably have an average grain size of e.g. a maximum of 30 µm, in order in this way to achieve better bearing of the back metal layer on the surface of the bearing mount. The average grain size refers to the average linear grain size, which is also known as the Heynsche grain size. The measurement of this structural characteristic is performed by the optical evaluation of microsections with reference to the guidelines on quantitative structural analyses which are the current prior art.

For a better understanding of the invention the latter is explained in more detail with reference to the following figures.

In a schematically simplified representation:

Figure 1:
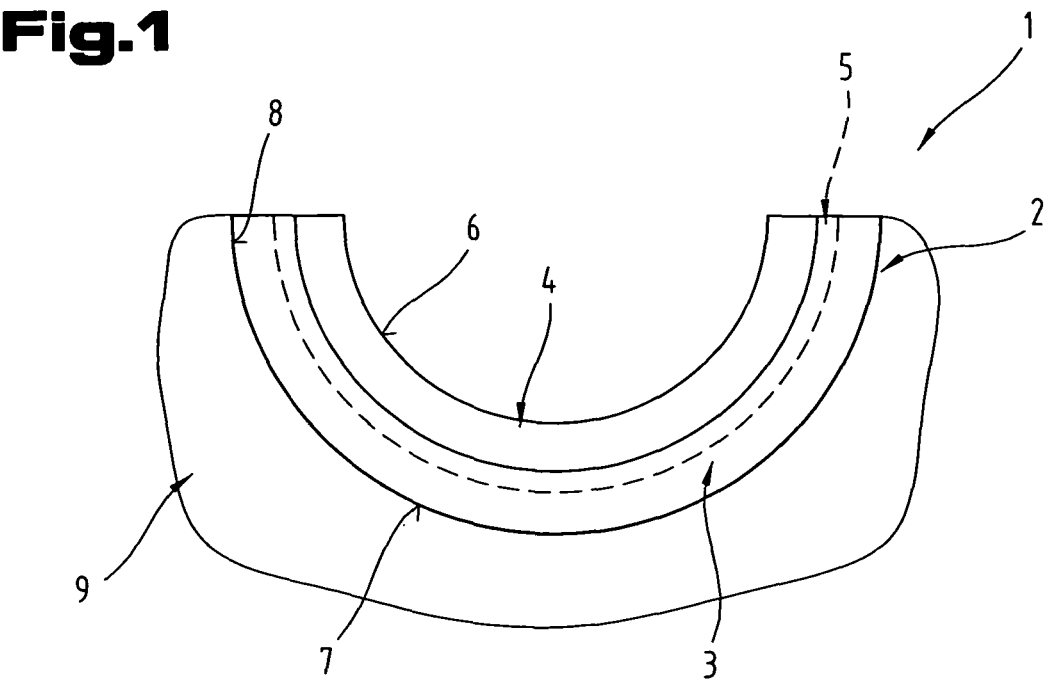
FIG. 1 shows an anti-friction bearing in the form of a multilayered bearing shell in side view.

First of all, it should be noted that in the variously described exemplary embodiments the same parts have been given the same reference numerals and the same component names, whereby the disclosures contained throughout the description can be applied to the same parts with the same reference numerals and same component names. Also details relating to position used in the description, such as e.g. top, bottom, side etc. relate to the currently described and represented figure and in case of a change in position should be adjusted to the new position.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

FIG. 1 shows an anti-friction bearing element 1 in the form of a multilayered bearing shell 2, which is configured as a so-called twin-material bearing and a back metal layer 3, which forms a support element or a support shell for the anti-friction bearing element 1, so that the latter is self-supporting and an anti-friction layer 4 is formed. The anti-friction layer 4 is thus arranged directly on the surface of the back metal layer 3 and joined to the latter.

However, the anti-friction bearing element 1 can also have more than two layers, for example three, four, five etc. Thus it is possible for example to arrange a bearing metal layer 5 between the back metal layer 3 and the anti-friction layer 4, as shown by dashed lines in FIG. 1, so that the anti-friction bearing element 1 is configured as a so-called three-material bearing consisting of three layers.

Furthermore, it is possible to provide an anti-friction paint layer directly on the anti-friction layer 4 or in place of the anti-friction layer 4.

It is also possible, as already known from the prior art, to arrange between the individual layers or at least individual layers, for example between the back metal layer 3 and anti-friction layer 4 or the bearing metal layer 5 and/or between the bearing metal layer 5 and the anti-friction layer 4, at least one intermediate layer in the form of a bonding layer or a diffusion barrier layer, in order to prevent the diffusion of individual components caused by heating the anti-friction bearing element 1 from one layer to another layer, and thereby the depletion of a layer on this element, or in order to improve the adhesive strength of the individual layers with one another. Thus it is also possible if necessary to arrange both a bonding layer and a diffusion barrier layer between the individual layers. However, it should be noted in particular that within the scope of the invention the direct layering of the back metal layer 3 on the bearing metal layer 5 or the anti-friction layer 4 is possible without the intermediate provision of additional layers.

Furthermore, on the anti-friction layer 4 a so-called running-in layer can be arranged, particularly in tribologically stressed areas of the multilayered bearing shell 2.

In principle, all suitable materials known from the prior art can be used for the anti-friction layer 4, the bearing metal layer 5, the anti-friction paint layer, the bonding layer and the diffusion barrier layer.

Thus for example the bearing metal layer 5 can be formed by:
bearing metals with an aluminium base (partly according to DIN ISO 4381 or 4383): AlSn6CuNi, AlSn20Cu, AlSi4Cd, AlCd3CuNi, AlSi11Cu, AlSn6Cu, AlSn40. AlSn25CuMn, AlSi11CuMgNi, AlZn4.5;
bearing metals with a copper base (partly according to DIN ISO 4383): CuSn10. CuAl10Fe5Ni5, CuZn31Si, CuSn8Bi10. CuSn2.5-11Zn0.5-5, e.g. CuSn4.5Zn;
bearing metals with a lead base:
PbSb10Sn6, PbSb15Sn10. PbSb15SnAs, PbSb14Sn9CuAs, PbSn10Cu2, PbSn18Cu2, PbSn10Ti02, PbSn9Cd, PbSn10;
bearing metals with a tin base:
SnSb8Cu4, SnSb12Cu6Pb.

For the bonding layers for example layers of pure aluminium or aluminium alloys can be used, such as e.g. AlSc3, or Mn, Ni, Fe, Cr, Co, Cu, Ag, Mo, Pd and alloys thereof as well as NiSn or CuSn alloys, etc.

Diffusion barrier layers can also be aluminium or aluminium alloy layers or nickel layers, or layers of Mn, Fe, Cr, Co, Cu, Ag, Mo, Pd and the alloys thereof, etc.

For the anti-friction layer 4 for example aluminium-based alloys can be used, such as e.g. AlSn20Cu, AlSn40Cu, AlBi15Mo2, AlBi11Cu0.5Ni0.5, AlBi25Cu, tin-based alloys, such as e.g. SnSb15Cu5, SnSb4Cu1. Copper-based alloys, such as e.g. CuBi20, CuZn31Si1, bismuth-based alloys, silver-based alloys Bi, Ag, Sn, white-metal alloys, alloys of nickel, etc.

The anti-friction paint layer can consist for example of an anti-friction paint with a polyamide-imide base with graphite and MoS2 as solid lubricants.

It should be noted that the above listings are only given by way of example. In summary it should be noted that the individual layers of the anti-friction bearing element 1 are made from metals or metal alloys, i.e. with the exception of the anti-friction paint layer, and not from plastic. Furthermore, said layers are preferably not made from sintered materials but from solid materials.

The individual layers of the anti-friction bearing element 1 can be arranged or precipitated according to methods of the prior art on the back metal layer 1 or the respective overlying layer. For example, the bearing metal layer 5 and/or anti-friction layer 4 and/or the diffusion barrier layer(s) and/or the bonding layer(s) can be deposited by rolling, galvanic coating, by PVD, in particular sputtering methods, CVD methods, laser coating methods and electron beam evaporation methods etc. The anti-friction paint layer is normally sprayed on but can also be applied by a different coating method. In general prior to depositing individual layers, in particular the bearing metal layer 5 and/or the anti-friction layer 4, the back metal layer 3 can still be flat so that the forming process into a multilayered bearing shell 2 can be performed after the application of at least individual layers, as long as said layers permit shaping.

As shown in FIG. 1, the back metal layer 3 bears with surface 7 opposite a radially inner anti-friction surface 6 on a surface 8 of a bearing mount 9. The back metal layer 3 is preferably formed on said outer surface 7 of the anti-friction bearing element 1, preferably completely coating-free, but in any case does not have an antifretting layer.

The anti-friction bearing element 1 shown in FIG. 1 in the installed stated has the form of an anti-friction bearing half shell. This means that the geometry of the anti-friction bearing element 1 outside the bearing mount 9 differs or can differ from the semi-circular form—as viewed in side view—in order in this way to achieve a better bearing fit by means of the spreading and mainly by means of the bearing projection. The half shell can thus enclose an angle which is slightly smaller than 180°, for example an angle that is a maximum of 5° smaller, so that the half shell can be fitted into the bearing position with formation of the 180° angle and with formation of tension in the bearing position, this means that the bearing mount 9 is secured. Consequently, the "half shell" can include spreading in order to achieve the sufficiently high tension or pressing force which is created by the pressing in process. The latter can also be achieved in that the multilayered bearing shell 2 has a so-called bearing projection, i.e. a length in circumferential direction which is greater than the length of the corresponding bearing mount 9 in the same direction. With regard to the tension formed by the spreading or the bearing projection the multilayered bearing shell 2 has very good characteristic values.

The not-closed multilayered bearing shell 2 can in addition to the half shell design with an angular overlap of at least 180° also have a different angular overlap, for example at least approximately 120° or at least approximately 90°, so that the multilayered bearing shell 2 can also be configured as a third shell, in particular for two-stroke diesel engines, or as a quarter shell, which are combined with corresponding additional bearing shells in the bearing mount 9, whereby the multilayered bearing shell 2 according to the invention is preferably installed in the area of the bearing mount 9 that receives the greatest loads.

The back metal layer 3 is made from a tin bronze, which in the simplest case includes, in addition to copper as the matrix element, tin in a proportion selected from a range with a lower limit of 1.25 wt. % and an upper limit of 12 wt. %, zinc in a proportion selected from a range with a lower limit of 0.25 wt. % and an upper limit of 6 wt. % and phosphorus in a proportion selected from a range with a lower limit of 0.01 wt. % and an upper limit of 0.5 wt. %. In particular, the back metal layer 3 consists of CuSn3-10Zn1-4P0.05-0.2, such as e.g. CuSn5Zn1P0.1, CuSn8Zn1P0.1, CuSn10Zn3P0.1, CuSn8Zn4P0.1 or CuSn3Zn3P0.1. Tin bronzes with these compositions have shown in test runs in engines that when in direct contact with the steel of the bearing mount 9 they have a low tendency to frictional welding or fretting, i.e. they have a high resistance to frictional corrosion. These properties of the tin bronze are not only better than the corresponding properties of steel, but are also better than the tendency towards fretting of bronzes containing Ni, Al and Fe. This means that the bronzes comprise much higher proportions of these elements, as described in more detail in the following, as these elements can be included in the tin bronze in small amounts.

In addition, said tin bronzes have both static and dynamic strengths, which are comparable to those of steel, whereby the replacement of the latter by tin bronze as a back metal layer 8 does not require additional changes in the bearing structure.

It is also significant that said tin bronzes can be processed in a continuous casting method, in particular by horizontal continuous casting. They can also be formed when cold without damage, and also have sufficient residual forming capacity so that pressing into bearing shells can be performed without performing additional steps. In addition, they can be rolled. In addition, with respect to the environment it is significant that the tin bronzes can be used without lead as a back metal layer 3.

With regard to the preferred ranges of the individual elements of the tin bronze and their effect in the tin bronze reference is made to the above explanations to avoid repetition, so that in the following the possible composition of the tin bronze is only discussed briefly.

Preferably, the total proportion of tin and zinc is a maximum of 15 wt. %.

In addition to this basic composition of the tin bronze it is also possible that at least one further alloy element is included for the formation of microalloying systems in the tin bronze or for grain refinement. In addition, a portion of the copper can be replaced in an amount to a maximum of 7 wt. % by at least one element from a group comprising cobalt, zirconium, manganese, titanium, magnesium, boron, niobium, vanadium, iron, chromium, scandium and carbon. In this way different structures can be formed (microalloying system, grain refinement for good formability and high strength also heat resistance, influencing the tribology by including intermetallic phases as spacers).

In addition, generally rare earth metals can also be included in an amount of a maximum of 0.1 wt. %, in particular a maximum of 0.05 wt. %.

In this case cobalt can be included in a proportion which is selected from a range with a lower limit of 0.01 wt. % and an upper limit of 2.0 wt. % and/or manganese in a proportion which is selected from a range with a lower limit of 0.01 wt. % and an upper limit of 0.5 wt. %, wherein the total proportion of the elements cobalt, zirconium and manganese is preferably selected from a range with a lower limit of 0.02 wt. % and an upper limit of 2.1 wt. %. The possible proportion of zirconium is thus taken from this total proportion minus the proportions of cobalt and/or manganese.

Titanium can be included in a proportion which is selected from a range with a lower limit of 0.05 wt. % and an upper limit of 0.5 wt. % and/or magnesium in a proportion which is selected from a range with a lower limit of 0.01 wt. % and an upper limit of 0.2 wt. %, wherein the total proportion of the elements titanium and magnesium is preferably selected from a range with a lower limit of 0.05 wt. % and an upper limit of 0.5 wt. %.

Niobium can be included in a proportion which is selected from a range with a lower limit of 0.01 wt. % and an upper limit of 0.5 wt. % and/or vanadium in a proportion which is selected from a range with a lower limit of 0.01 wt. % and an upper limit of 0.25 wt. % and/or iron in a proportion which is selected from a range with a lower limit of 0.1 wt. % and an upper limit of 2.0 wt. %, wherein the total proportion of the elements niobium, vanadium and iron is preferably selected from a range with a lower limit of 0.01 wt. % and an upper limit of 2.0 wt. %.

Chromium can be included in a proportion which is selected from a range with a lower limit of 0.01 wt. % and an upper limit of 1.6 wt. %.

Scandium can be alloyed in a proportion of a maximum of 0.3 wt. %.

Boron can be alloyed in a proportion which is selected from a range with a lower limit of 0.08 wt. % and an upper limit of 0.15 wt. %.

The proportion of carbon can be selected from a range with a lower limit of 0.05 wt. % and an upper limit of 0.15 wt. %.

It is also possible for part of the copper to be replaced by nickel in a proportion of a maximum of 2 wt. %, whereby in this case preferably the proportion of phosphorus in the tin bronze is a maximum of 0.25 wt. %.

However, in the preferred embodiment variant of the tin bronze the latter is nickel-free and/or aluminium-free for the above reasons.

As part of the testing of possible, exemplary compositions for the back metal layer 3 the following alloys summarised in table 1 were produced. All of the information is given in wt. %. The remainder is formed by Cu in each case.

TABLE 1 possible composition of the tin bronze

| Nr. | Sn | Zn | P | Co | Zr | Mn | Ti | Mg | B | Nb | V | Fe | Cr | Sc | C | Ni |
|---|---|---|---|---|---|---|---|---|---|---|---|---|---|---|---|---|
| 1 | 4 | 1 | 0.12 | — | — | 0.05 | — | — | — | — | — | — | — | — | — | — |
| 2 | 4 | 1 | 0.12 | 0.05 | — | 0.05 | — | — | — | — | — | — | — | — | — | — |
| 3 | 4 | 1 | 0.12 | 0.05 | — | — | — | — | — | — | — | — | — | — | — | — |
| 4 | 4 | 1 | 0.10 | — | 0.02 | — | 0.05 | 0.03 | — | — | — | — | — | — | — | — |
| 5 | 4 | 1 | 0.10 | — | — | 0.05 | — | — | — | — | — | — | 0.05 | — | — | — |
| 6 | 4 | 1 | 0.05 | — | 0.03 | — | 0.05 | — | — | — | — | — | — | — | 0.1 | — |
| 7 | 4 | 1 | 0.10 | — | — | 0.05 | — | — | — | — | — | — | — | 0.2 | — | — |
| 8 | 4 | 1 | 0.01 | — | — | — | — | — | 0.1 | 0.05 | — | — | — | — | — | — |
| 9 | 4 | 1 | 0.10 | 0.1 | — | — | — | — | 0.1 | — | — | 0.15 | — | — | — | — |
| 10 | 4 | 1 | 0.12 | 0.05 | — | 0.05 | — | — | — | — | — | 0.15 | — | — | — | 0.10 |
| 11 | 5 | 1 | 0.12 | — | — | 0.05 | — | — | — | — | — | — | — | — | — | — |
| 12 | 5 | 1 | 0.12 | 0.05 | — | 0.05 | — | — | — | — | — | — | — | — | — | — |
| 13 | 5 | 1 | 0.12 | 0.05 | — | — | — | — | — | — | — | — | — | — | — | — |
| 14 | 5 | 1 | 0.10 | — | 0.02 | — | 0.05 | 0.03 | — | — | — | — | — | — | — | — |
| 15 | 5 | 1 | 0.10 | — | — | 0.05 | — | — | — | — | — | — | 0.05 | — | — | — |
| 16 | 5 | 1 | 0.05 | — | 0.03 | — | 0.05 | — | — | — | — | — | — | — | 0.1 | — |
| 17 | 5 | 1 | 0.10 | — | — | 0.05 | — | — | — | — | — | — | — | 0.2 | — | — |
| 18 | 5 | 1 | 0.01 | — | — | — | — | — | 0.1 | 0.05 | — | — | — | — | — | — |
| 19 | 5 | 1 | 0.10 | 0.1 | — | — | — | — | 0.1 | — | — | 0.15 | — | — | — | — |
| 20 | 5 | 1 | 0.12 | 0.05 | — | 0.05 | — | — | — | — | — | 0.15 | — | — | — | 0.10 |
| 21 | 8 | 1 | 0.12 | 0.05 | — | 0.05 | — | — | — | — | — | — | — | — | — | — |
| 22 | 8 | 1 | 0.10 | — | — | 0.05 | — | — | — | — | — | — | 0.05 | — | — | — |
| 23 | 8 | 1 | 0.05 | — | 0.03 | — | 0.05 | — | — | — | — | — | — | — | 0.1 | — |
| 24 | 8 | 1 | 0.12 | 0.05 | — | 0.05 | — | — | — | — | — | 0.15 | — | — | — | 0.10 |
| 25 | 8 | 1 | 0.10 | — | — | 0.05 | — | — | — | — | — | — | — | 0.2 | — | — |
| 26 | 8 | 5 | 0.12 | 0.05 | — | 0.05 | — | — | — | — | — | — | — | — | — | — |
| 27 | 8 | 5 | 0.10 | — | — | 0.05 | — | — | — | — | — | — | 0.05 | — | — | — |
| 28 | 8 | 5 | 0.05 | — | 0.03 | — | 0.05 | — | — | — | — | — | — | — | 0.1 | — |
| 29 | 8 | 5 | 0.12 | 0.05 | — | 0.05 | — | — | — | — | — | 0.15 | — | — | — | 0.10 |
| 30 | 8 | 5 | 0.10 | — | — | 0.05 | — | — | — | — | — | — | — | 0.2 | — | — |

It would exceed the scope of this description to go into detail about the test results of all of these compositions. Therefore, this is restricted in the following to one composition. This is the case in particular because the tests performed produced comparable results with regard to the tendency towards antifretting and the alternate bending tests, whereby better results were achieved with the addition of the alternative alloy elements than with the basic composition.

For tests described in the following a bearing half shell was used with the structure of a back metal layer 3 made of CuSn5Zn1P0.12Cu0.05Mn0.05, and on top of this an anti-friction layer 4 consisting of a sputtered layer of composition AlSn20Cu1, and also an anti-friction paint layer with a composition as described in EP 1 717 469 A2, which in this respect is linked to the content of this description. Said bearing half shell was used as the lower half shell. The upper half shell had the structure of a back metal layer 3 made of CuSn5Zn1P0.12Cu0.05Mn0.05 and on top of this an anti-friction paint layer with a composition as described in EP 1 717 469 A2.

For comparison bearings were produced according to this structure, but the back metal layer 3 was not made from tin bronze but from steel 010.

Figure 2:
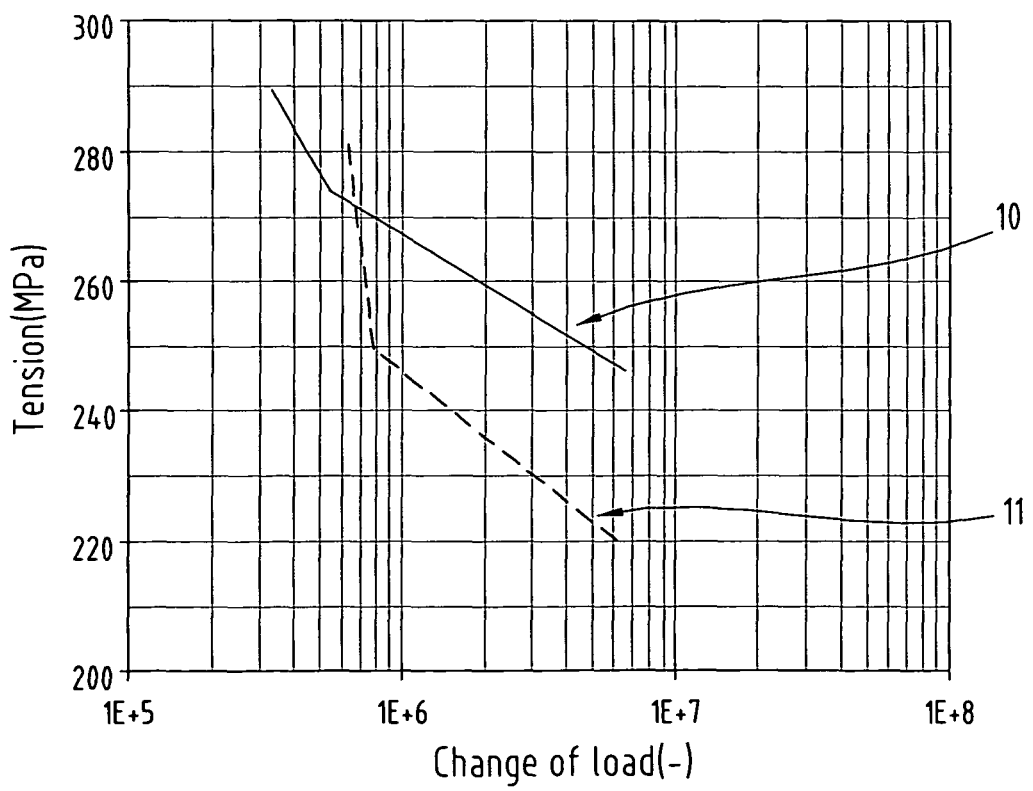
FIG. 2 shows the alternate bending strength of CuSn5Zn1P0.1CoMn compared to steel.

FIG. 2 shows the results of the alternate bending test as a test for the fatigue strength of the anti-friction bearing according to DIN 50 142 at room temperature. The y-axis shows the alternate bending strength (tension) in MPa and the x-axis shows the number of load changes on a logarithmic scale. Curve 10 shows the anti-friction bearing according to the invention with the back metal layer 3 made of tin bronze, curve 11 shows the anti-friction bearing with the steel back metal layer.

It has been shown that the alternate bending strength for the alloy according to the invention reached strength values, which are comparable with those of a "steel bearing", whereby for longer running times of the anti-friction bearing the bearing according to the invention (curve 10) proved better than the anti-friction bearing according to the prior art (curve 11).

Figure 3:
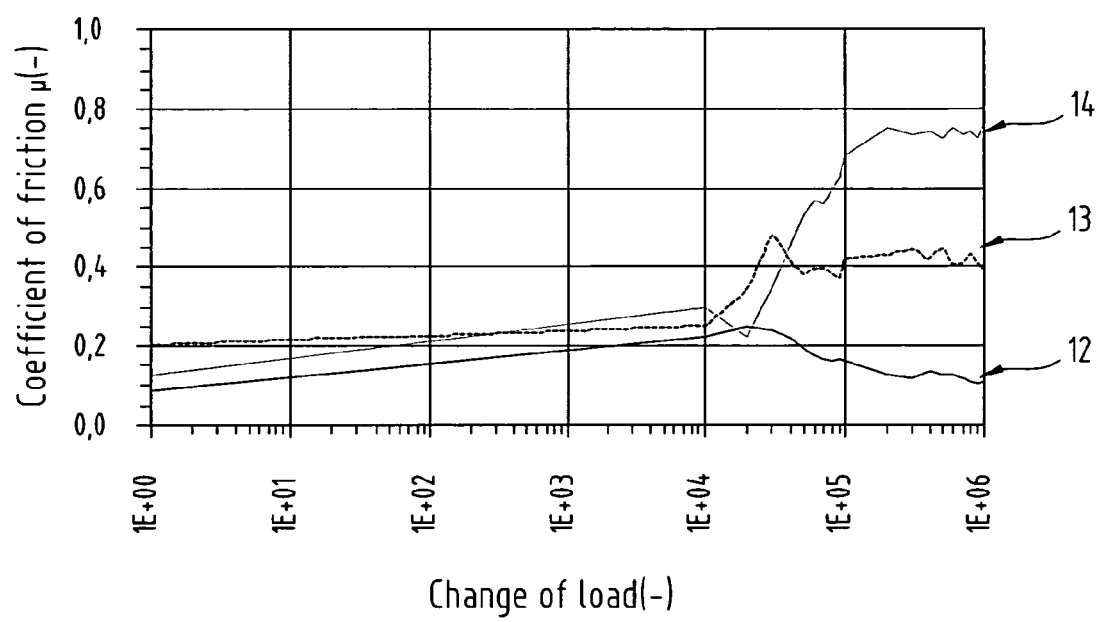
FIG. 3 shows the result of the fretting test of CuSn5Zn1P0.1CoMn and CuSn5Zn1Ni4Al2 compared to steel.

FIG. 3 is a graphic representation of the results of the fretting test (tendency to frictional corrosion). Curves 12 and 13 show the results for anti-friction bearings according to the structures used for determining the alternate bending strength according to FIG. 2 (curve 12=CuSn5Zn1P0.12Cu0.05Mn0.05 back metal layer 3, curve 13=steel C10 back metal layer). For curve 14 the same structure of the lower and the upper half shell was used, whereby a tin bronze with the composition CuSn5Zn1Ni4Al2 was used as the back metal layer. On the y-axis in FIG. 3 the coefficient of friction to steel is entered (bearing mount 9). The x-axis shows the number of load changes on a logarithmic scale. The tests were performed at a constant surface pressure of 7 MPa, a frequency of 30 Hz and an amplitude of 70 μm.

As shown clearly in FIG. 3 both tin bronzes are initially better than steel with regard to the tendency to fretting. Over longer running times however the picture changes. The tin bronze CuSn5Zn1P0.12Cu0.05Mn0.05 is still better than steel with respect to the frictional corrosion, however the tin bronze of the composition CuSn5Zn1Ni4Al2 is much worse, even worse than the "steel bearing". This is also the reason why the tin bronze for the back metal layer 3 is preferably nickel-free and/or aluminium-free.

To complete the picture Table 2 shows the static strength values (tensile test according to DIN EN ISO 6892-1) of the bearings used in FIG. 2.

TABLE 2

| | | Tensile test according to DIN EN ISO 6892-1 | | | |
|---|---|---|---|---|---|
| | State | Brinell hardness (HB2.5/ 62.5) | Yield strength Rp0.2 (MPa) | Tensile strength Rm (MPa) | Elongation at break A (%) |
| CuSn5Zn1P 0.12CoMn | fine grain as-rolled | 180 | 570 | 580 | 10 |
| CuSn5Zn1P 0.12CoMn | coarse grain as-rolled | 200 | 650 | 700 | 5 |
| steel C10 | as-rolled | 187 | 570 | 572 | 12 |

Table 2 shows that the back metal layer 3 according to the invention provides comparable strength values with the tin bronze, as that of the steel back metal layer. Table 2 also shows that it can be an advantage to limit the maximum grain size of the tin bronze to a maximum value. Tests have shown that the maximum grain size—with respect to the definition of the maximum grain size refer to the above explanations— should not exceed a value of 30 μm, in particular 20 μm. The reason for this is as follows.

In the first series of tests with CuSn5Zn1P0.12CoMn alloy during the process chain no attention was paid to the grain size, the required mechanical characteristics of the starting material (band) were achieved, as the greatest proportion of the strength could be acquired from the shaping hardening, but there was a problem with having a very rough structure. In the subsequent forming processes into a half shell a so-called "orange-skin" effect appeared on the back of the bearing. This refers to locally small depressions in the μm range, which on the one hand are an optical problem, as the bearing back is no longer uniformly smooth, and on the other hand these light depressions produce a non-optimal or uneven positioning of the back bearing in the bearing mount 9. Depending on the respective use this can have a disadvantageous effect on the performance of the bearing, as the fit of the bearing shell is not optimal.

The orange skin is formed to a significant extent during the shaping process into a bearing shell (compressing), by flow lines in the differently orientated grains under the condition that the material has a high degree of hardness from preceding shaping processes. Once the orange skin has formed it is no longer possible to remove it later by means of thermo-mechanical processes.

One way of reducing the orange skin appearance is to adjust to a smaller grain size. The production process can therefore be modified so that in the finished band material a fine-grain structure is obtained. This is achieved in that the rolling process of the casting material is interrupted after a specific amount of forming, in particular 50% and recrystallizing intermediate annealing is performed. The intermediate annealing is then performed at a temperature selected from a range with a lower limit of 400° C. and an upper limit of 600° C., in particular from a range with a lower limit of 500° C. and an upper limit of 550° C. By means of the cold forming used and the subsequent recrystallization a fine-grained but softened structure is formed. By means of further cold rolling the material is hardened again (deformation hardening). By means of this method a bearing surface of the back metal layer 3 on the bearing mount 9 can be achieved of at least 75%, in particular at least 85%.

The fine grain structure, e.g. with a maximum average grain size of 30 μm, has the advantage that the tin bronze has more homogenous properties, a higher elongation at break than coarse grain (see also table 2), an even back bearing and an improved back surface. However, it is also associated with the disadvantage that the hardening (by means of the shaping hardening) is not quite so high as with coarse grains (average grain size several 100 μm), as with the intermediate annealing the subsequent level of rolling is smaller than without intermediate annealing.

As an alternative to this processing or in addition thereto the fine grain structure can be achieved with the maximum average grain size of 30 μm mentioned in the preceding section, also by the addition of grain refiners, as described above.

Alternatively or also in addition to the processing mentioned in the preceding paragraphs also a subsequent mechanical or a material-removing working can be performed in order to address the problem of orange skin. Known methods from the prior art are given as possible processing methods, e.g. grinding or precision turning the surface.

The aforementioned processes show possible variants in order to address the problem of orange skin on the back metal layer 3. Which of the said options is used is dependent on the respective application of the multilayered bearing shell 2 according to the invention.

The back metal layer 3 according to the invention is preferably produced by (horizontal) continuous casting as a strip-like starting material. After rolling the additional layers are applied in sequence, whereby the latter can be deposited by means of suitable methods from the prior art. In this way finished multilayered bearing shells are produced which are not separated by breaking for the formation of the bearing shell.

Having tin bronze for the back metal layer 3 instead of a steel back metal layer also has the advantage that to improve the positioning of the bearing shell on the face side of the bearing shell a so-called slit cam can be introduced, as described in AT 412 812 B, which thus belongs in this context to the description of the present invention.

The back metal layer according to the invention can be used for the production of anti-friction elements in the diesel engines of boats, in so-called high-speed-runners, in engines for lorries, in high-pressure compressors or also in the bearing points of wind power stations.

The exemplary embodiments show possible embodiment variants of the back metal layer 3, whereby it should be noted at this point that various different combinations of the individual embodiment variants are also possible and this variability, due to the teaching on technical procedure, lies within the ability of a person skilled in the art in this technical field. Thus all conceivable embodiment variants, which are made possible by combining individual details of the embodiment variants shown and described, are also covered by the scope of protection.

Finally, as a point of formality, it should be noted that for a better understanding of the structure of the anti-friction bearing element 1 the latter and its components have not been represented true to scale in part and/or have been enlarged and/or reduced in size.

LIST OF REFERENCE NUMERALS

1. Anti-friction bearing element
2. Multilayered bearing shell
3. Back metal layer
4. Anti-friction layer
5. Bearing metal layer
6. Anti-friction surface
7. Surface
8. Surface 9. Bearing mount
10. Curve
11. Curve
12. Curve
13. Curve
14. Curve

The invention claimed is:

1. A multilayered bearing shell (2) comprising a back metal layer (3) as a carrier element of the layer structure and at least one further bearing layer joined to the back metal layer (3), wherein the back metal layer (3) is made from a bronze, wherein the back metal layer (3) in addition to copper, which forms the matrix of the bronze, consists of tin in a proportion selected from a range with a lower limit of 3 wt. % and an upper limit of 12 wt. %, zinc in a proportion selected from a range with a lower limit of 0.25 wt. % and an upper limit of 6 wt. % and phosphorus in a proportion selected from a range with a lower limit of 0.01 wt. % and an upper limit of 0.5 wt. %, and wherein the back metal layer is in direct contact with a bearing mount after installation of the multilayered bearing shell.

2. The multilayered bearing shell (2) according to claim 1, wherein the total proportion of tin and zinc is a maximum of 15 wt. %.

3. The multilayered bearing shell (2) according to claim 1, wherein the bronze has a maximum average grain size of 30 µm.

4. A multilayered bearing shell (2) comprising a back metal layer (3) as a carrier element of the layer structure and at least one further bearing layer joined to the back metal layer (3), wherein the back metal layer (3) is made from a bronze, wherein the back metal layer (3) in addition to copper, which forms the matrix of the bronze, consists of tin in a proportion selected from a range with a lower limit of 3 wt. % and an upper limit of 12 wt. %, zinc in a proportion selected from a range with a lower limit of 0.25 wt. % and an upper limit of 6 wt. %, phosphorus in a proportion selected from a range with a lower limit of 0.01 wt. % and an upper limit of 0.5 wt. %, and at least one element from the group consisting of cobalt, zirconium, manganese, titanium, boron, niobium, vanadium, iron, chromium, scandium, carbon, and rare earth elements in an amount to a maximum of 7 wt. %, wherein:

the amount of rare earth elements is of a maximum of 0.1 wt. %;
the proportion of cobalt is selected from a range with a lower limit of 0.01 wt. % and an upper limit of 2.0 wt. %;
the proportion of zirconium is selected from a range with a lower limit of 0.01 wt. % and an upper limit of 2.09 wt. %;
the proportion of manganese is selected from a range with a lower limit of 0.01 wt. % and an upper limit of 2.0 wt. %;
the proportion of titanium is selected from a range with a lower limit of 0.05 wt. % and an upper limit of 0.5 wt. %;
the proportion of boron is selected from a range with a lower limit of 0.08 wt. % and an upper limit of 0.15 wt. %;
the proportion of niobium is selected from a range with a lower limit of 0.01 wt. % and an upper limit of 0.5 wt. %;
the proportion of vanadium is selected from a range with a lower limit of 0.01 wt. % and an upper limit of 0.25 wt. %;
the proportion of iron is selected from a range with a lower limit of 0.1 wt. % and an upper limit of 2.0 wt. %;
the proportion of chromium is selected from a range with a lower limit of 0.01 wt. % and an upper limit of 1.6 wt. %;
the proportion of scandium is of a maximum of 0.3 wt. %; and
the proportion of carbon is selected from a range with a lower limit of 0.05 wt. % and an upper limit of 0.15 wt. %; and
wherein the back metal layer is in direct contact with a bearing mount after installation of the multilayered bearing shell.

5. The multilayered bearing shell (2) according to claim 4, wherein the total proportion of tin and zinc is a maximum of 15 wt. %.

6. The multilayered anti-friction bearing (2) according to claim 4, wherein a portion of the copper is replaced by nickel in a proportion to a maximum of 2 wt. %.

7. The multilayered anti-friction bearing (2) according to claim 6, wherein the bronze contains nickel and phosphorus and the proportion of phosphorus is a maximum of 0.25 wt. %.

8. The multilayered bearing shell (2) according to claim 4, wherein the bronze is nickel-free and/or aluminium-free.

9. The multilayered bearing shell (2) according to claim 4, wherein the bronze has a maximum average grain size of 30 µm.

* * * * *